(12) United States Patent
Fargo

(10) Patent No.: US 7,596,513 B2
(45) Date of Patent: Sep. 29, 2009

(54) INTERNET ENHANCED LOCAL SHOPPING SYSTEM AND METHOD

(75) Inventor: Kendall Fargo, San Francisco, CA (US)

(73) Assignee: Intuit Inc., Mountain View, CA (US)

( * ) Notice: Subject to any disclaimer, the term of this patent is extended or adjusted under 35 U.S.C. 154(b) by 61 days.

(21) Appl. No.: 10/977,078

(22) Filed: Oct. 28, 2004

(65) Prior Publication Data

US 2005/0097005 A1 May 5, 2005

Related U.S. Application Data

(60) Provisional application No. 60/516,663, filed on Oct. 31, 2003.

(51) Int. Cl.
*G06Q 30/00* (2006.01)
(52) U.S. Cl. ...................................................... 705/26
(58) Field of Classification Search .................. 705/26, 705/27
See application file for complete search history.

(56) References Cited

U.S. PATENT DOCUMENTS 6,249,772 B1 * 6/2001 Walker et al. .................. 705/26
6,396,531 B1 * 5/2002 Gerszberg et al. ......... 348/14.01
2002/0026380 A1 * 2/2002 Su ................................ 705/26
2002/0087522 A1 * 7/2002 MacGregor et al. ............ 707/3
2003/0084037 A1 * 5/2003 Kizuka ........................... 707/3
2003/0088472 A1 * 5/2003 Offutt et al. ................... 705/22
2003/0182057 A1 * 9/2003 Burt et al. .................... 701/213
2004/0102197 A1 * 5/2004 Dietz ....................... 455/456.1
2005/0091125 A1 * 4/2005 Ikeda ........................... 705/26
2005/0131578 A1 * 6/2005 Weaver ........................ 700/244
2005/0256766 A1 * 11/2005 Garcia et al. .................. 705/14
2007/0124216 A1 * 5/2007 Lucas ........................... 705/27

OTHER PUBLICATIONS

Friedlob, National Public Accountant, Washington,: Oct. 1991, vol. 36, Iss. 10, p. 40, 5 pgs. http://proquest.umi.com/pqdweb?did=661729&sid=1&Fmt=3&clientId=19649&RQT=309&VName=PQD.*

* cited by examiner

*Primary Examiner*—Jeffrey A. Smith
*Assistant Examiner*—Mila Airapetian
(74) *Attorney, Agent, or Firm*—Osha • Liang LLP

(57) ABSTRACT

Internet enhanced local shopping system in which businesses having physical stores where products and services can be purchased submit their inventories and business terms, including their geographic locations, into a searchable database available to shoppers wanting to buy products and services locally so that shoppers can find stores in their area where the products and services they desire are available and can be purchased under specified terms.

34 Claims, 1 Drawing Sheet

INTERNET ENHANCED LOCAL SHOPPING SYSTEM AND METHOD

FIELD OF THE INVENTION

The present invention relates to Internet-enabled e-commerce systems and methods and, more particularly, to an e-commerce system and method that provides incremental selling opportunities for retailers and service businesses with physical locations by making available for searching product and service inventories and location data that may not currently be seen on the web so that shoppers can find and purchase products and services that are available to them locally.

BACKGROUND

Many shoppers use the Internet to do product research as part of their shopping process. Since shoppers typically do not know where to start looking on the Internet for a specific product, they use Internet search engines to help them locate products or product categories. These search engines have become incredibly efficient at finding and categorizing billions of web pages. The search engines go out and "crawl" or "spider" the web. When a search engine finds a new web page, it categorizes it so that it can be matched to the words that are used when someone engages the search engine.

Since each search engine categorizes hundreds of millions or even billions of web pages, these search engines use algorithms to determine the relevancy of those web pages. Prior to the present invention, however, there has been no way for a search to be conducted in which the ranking is based on stores with physical locations where products and services can actually be purchased and physical proximity of such stores to the shopper. Consequently, while the Internet can provide an abundance of information about a product or product category, it is not presently set up to sort through the multitude of what it considers relevant sites and extract those that relate to a store with a physical location that actually carries and sells the product where the shopper can inspect and purchase the product. And, it cannot tell a shopper where the nearest such store is located. It also will not be able to give the shopper his or her local shopping options if multiple stores within his or her local area have the product in inventory.

Many shoppers are interested in doing product research on the web, but they would prefer to buy the product locally because they need it immediately, want to inspect the product in person, do not want to pay shipping fees or want to support local establishments.

Merchants with a physical store can get an Internet web site and list their products on the site, but the Internet search engines do not effectively help a shopper find those physical stores that sell the desired product or service since, when the search engine does a search, it looks for key word matches and is not designed to connect the shopper to a physical store (that has the product in inventory) that is geographically near the shopper. Thus, merchants with a physical store are not yet well served by creating and maintaining a web site.

Search engines are good at searching what is on the web, but they lack the ability to take product inventory and location data that is not on the web and make it searchable so that shoppers can find and purchase products and services that are available to them locally.

PRIOR ART

Currently, for shoppers, the process of finding a product or service that they need in their local area is broken. The methods that shoppers use to find these products or services are outdated and very inefficient.

Yellow Page Directories

The Yellow Page directories have been the traditional method of shopping locally. This process of using the Yellow Pages includes guessing that a certain category of store will carry a product or service the shopper needs because it sells similar products. The shopper then usually calls a store selected out of the Yellow Pages to inquire whether they have the product. This process presents a significant number of problems for shoppers, including:

1. The Yellow Pages only allow the shopper to search by business category or business name when the shopper wants to be able to search for a specific product or service. The Yellow Page search method is also a very slow process and the shopper has only a limited chance of finding what he or she is looking for when he or she uses these store category association methods for finding a product or service.
2. The shopper will most likely not be exposed to all shopping options since there will likely be stores in the area that carry the item or service that the shopper needs, but since the store does not fit in the shopper's perceived category that would have the product or service, it does not get considered by the shopper. This also limits the shopper's likelihood of being exposed to all of the price options.
3. It is very time-intensive for the store employee who receives a call from a shopper to go look for and describe an item to the customer, so they will usually not verify the inventory of a product in the store or will verify it incorrectly.

The Yellow Pages shopping method also presents an additional problem to the stores since many stores will have inventories of products and services that shoppers would never imagine (because they are outside the customer's perceived category for the store) would be available in the store, so the products or services will not sell in an efficient manner (thus tying up business capital and sitting "on the shelf" as unrealized revenue opportunities for the merchant).

With the introduction of the Internet, several companies have scanned the Yellow Page listings into a web searchable format, but this still does not: a) give the businesses a presence on the Internet since their product inventories are still not visible; and b) help shoppers find products in their local area since shoppers are still only able to search by business name or business category when they want to be able to search for specific products or services.

Similar to the web-formatted Yellow Page directories, there are other web directories of businesses such as Vindigo, CitySearch or Kiosks that may be located at a mall, but these business directories do not help shoppers search the local current inventories of products and services.

Web Store Front Solutions

Today, businesses with physical stores have the opportunity to choose from many web storefront solution offerings.

Basically, these web site storefront software solutions allow a small business to launch its own web site with electronic store capabilities. These solutions require the business to maintain its own web site content and only have manual systems for managing its current inventories that are shown on the web. Considering that most small businesses are significantly strapped for resources and do not have any significant knowledge or desire to manage their own web site, this is not a viable solution for most small businesses. Plus, the inventory management systems of the web site storefronts do not take into account the likely scenario that the business will sell products out of its physical store to customers who visit the business locally, so this results in web orders being accepted for products that are currently out of stock.

The number one reason that web site storefront solutions have failed with small business customers is that just launching and maintaining a site is not good enough unless significant traffic is being driven to the site. Web site hosting companies do not have the skills or resources to drive traffic to their customers' sites and the small businesses definitely do not have the ability to drive their own traffic. More importantly, the web site storefront software solutions are only focused on the web channel and are completely disconnected from the businesses' desire to also sell products through their physical location. Considering that these web site storefront solutions have no ability, even with the help of Internet search engines, to match a local shopper with the available local inventory offering from businesses, there is no ability to drive local shopping with these tools.

eBay Stores and Amazon z-shop Offerings eBay has expanded its offerings outside of auctions to attract small businesses with the eBay stores model and Amazon has added transaction services called z-shops to attract small businesses to sell their products on Amazon.

eBay Stores and Amazon z-shops do not well serve physical store businesses because they only focus on the web channel and are completely disconnected from the businesses' desire to also sell products through their physical location. eBay and Amazon have no functionality to help shoppers on the web determine whether they can purchase the product listed from a local physical store. eBay and Amazon also do not automatically update inventory information from physical store locations.

Offerings from Google, Yahoo and other web search tools/engines are very good at searching all the available content on the web, but to be successful with driving sales for the businesses in the physical world requires functionality that will extract and continually synchronize the inventory data from within the businesses that indicate which physical stores have current inventory of a product or service. Prior art search engines do not offer this functionality.

Offerings from Shopping Directories

There are many shopping directories on the web. The most well known shopping directories include Shopper.com, Pricegrabber.com, Shopping.com (formerly Dealtime), Bizrate.com and Nextag.com. These sites and others like them are primarily customer acquisition tools for established web stores that work by allowing web stores to submit their web store inventories.

Since shopping comparison sites are basically a customer acquisition tool for large web stores, there are no opportunities for physical store businesses to get their products merchandised through these channels. These shopping directories also do not offer any functionality for shoppers to purchase a product locally.

Offerings from LiveDeal

LiveDeal is a marketplace for individuals who want to sell products locally to shoppers who want to buy products locally. LiveDeal only has a manual web form-based process for listing products on its web marketplace. LiveDeal also does not handle any web transactions for its sellers. Shoppers want to know all of their local shopping options from local businesses, and to accurately give shoppers that ability to find all of their shopping options within a local area, a system needs to automate the process of frequently extracting the current inventory of products from businesses. LiveDeal's system does not have any inventory upload automation, so LiveDeal's shoppers do not get any current localized inventory information from businesses that do not have a web presence with updated inventory listings.

Offerings from Channel Intelligence

Channel Intelligence works with manufacturers and retailers that already have a web presence to show which stores have a desired product in inventory. However, Channel Intelligence does not have an ability for businesses without a web presence to have their products included in the web shopping interface presented by Channel Intelligence. That means that web shoppers who use Channel Intelligence's system to try and find a product locally will be severely limited by not being given the product offerings of stores without a web presence. Channel Intelligence also does not offer the ability for shoppers to search locally for a product across many stores nor does it handle any web transactions for its sellers. Shoppers want to know all of their local shopping options from local businesses, and to accurately give shoppers that ability to find all of their shopping options within a local area, a system needs to automate the process of frequently extracting the current inventory of products from businesses. Channel Intelligence's system does not have any inventory upload automation, so Channel Intelligence's shoppers do not get any current localized inventory information from businesses that do not have a web presence with updated inventory listings. Channel Intelligence does not help shoppers find products that don't include a brand name. So, searching for "ankle weights" would not give the shopper any local shopping options.

For shoppers on the move, it is worthwhile to note that in the physical world, there has never been a resource for people to use mobile devices to search for an item or a service that may be available at a business in their local area.

SUMMARY OF THE INVENTION

The enhanced local shopping system of the present invention uses the reach of the Internet to provide businesses with physical stores with an easy and effective way to automatically merchandise their product and service inventories to a large web audience who is driven to the physical stores, and simultaneously provides shoppers with an easy and efficient process for finding and purchasing desired products and services available in their local area.

Over the past decade or so, the use of computer accounting and inventory management systems (i.e., QuickBooks from Intuit, Inc.) by retailers to account for their business activities, including the contents of their inventory, has become ubiquitous. As a result, a very high percentage of inventories of retail merchants are in digital form in a database. Moreover, because these inventory systems are frequently tied into the point-of-sale accounting, they are typically "up to the minute." Prior to the present invention, these retail inventories were not fed into, and kept current in, a single searchable database where shoppers could prowl for goods and services.

From the sellers' side, the system of the invention provides an interactive web site through which businesses with physical stores that contract to use the system (member stores) are able to feed (using an automated process, if they choose) their current inventories of offered products and services into a searchable database. For each such posted inventory, the system of the invention associates the offering member store, its terms and conditions for doing business, and its geographical location.

From the shoppers' side, any shopper can access the system web site with an Internet browser using a computer or a wirelessly-connected mobile device. Once the shopper accesses the system web site, the shopper is prompted to submit a search term, and then the shopper is given an option (by the shopper submitting his or her location address, or the system may use the location services that are offered by the wireless carriers to determine the shopper's location) of finding a physical store within a specified geographical area (e.g., the shopper can choose within 10 miles, 25 miles, 100 miles, etc.) that sells the product or service he or she is looking for. The system then checks the stores within the specified distance to determine if any of the stores have the desired product or service currently in inventory.

The system then presents to the shopper the stores within the specified distance that have the matching product or service currently in inventory so the shopper can select the store he or she would like to patronize. The system then offers the shopper directions to the store by using a mapping service or application. If a search does not provide the desired results, the search can be repeated for a different or enlarged geographic area.

The invention also offers the option to the shopper of purchasing the product over the web where the system's e-commerce functionality processes transactions for member stores that do not have that capability and have contracted to use the system's e-commerce functionality. The shopper is able to indicate whether he or she would prefer to have the item shipped to the shopper's location or to have the member store reserve the service or hold the product locally for the shopper to come in and pick up.

A member store is given the capability of importing its inventories from its accounting or inventory systems into the system's searchable database by a desktop application provided by the system. The system can gather inventory data from businesses that have a significant web presence, as well as from businesses that don't have any web presence, and merge the inventory information to present more complete product or service shopping options to the shopper to better determine which business is their best local shopping option. The system uses several techniques to ensure that it has updated available inventory information from all member stores. These techniques include using a software application that automatically extracts inventory data from accounting or inventory systems, accepting automated inventory uploads over the Internet from accounting or inventory systems, making data calls over the Internet to systems for member stores with multiple locations to receive real-time inventory information in specific local chain store locations that are in the desired area for the shopper. When a member store has several locations, the system may host inventory files for the entire business and then match a product desired by a shopper to the member store and send a web call (data request) over the Internet to get the real-time inventory matches from the store locations in the shopper's desired area. Shoppers are able to search for a product or service using the system and will receive the most complete local shopping options in their desired area from all levels of businesses, whether they are small stores with no web presence or they are major chain stores with an established web presence.

Another key benefit, of the invention is the ability to allow shoppers to search for and book services within their area. The system extracts inventory information of available service appointments from hosted systems or applications that handle service appointments or reservations (like Turbcalendar, OpenTable and Wallcharts). The system of the invention can include a software client that interfaces on the member store's PC with the software applications that handle the scheduling functionality so the system can offer appointments to shoppers. The system can also handle the transaction for the down payment for the service, if the member store business requires it to secure an appointment. In this way, the invention allows shoppers to search for a service across many service businesses in their local area to find which local businesses have an available opening to perform the desired service at the desired time and at the best price. When shoppers choose the member store with which they want to do business, they can book an appointment at any time of the day or night without having to make a phone call during business hours.

Another feature of the system of the invention makes it easier for shoppers to buy multiple products. The system allows shoppers to search for multiple products at the same time so they can see if there is a store that carries both products. Or, if there is not a single store that carries both products, then the shopper will want the option of getting a list of stores in the same area that are physically close to each other and offer the wanted products. In one embodiment, the system includes a mapping application so it can present driving directions that take the shopper to the first store and then to the second store from the first store.

Accordingly, it is an object of the present invention to provide an enhanced local shopping system that permits shoppers who are looking for a product or service to search from a single web site the current inventories of numerous physical store businesses, whether they otherwise have a web presence or not.

It is another object of the present invention to provide an enhanced local shopping system that continually extracts current inventory data from inventory or accounting systems of multiple businesses with physical stores and adds the data to a searchable database so that shoppers using the web can find local (distance determined by the shopper) shopping options which include products and services from stores whose physical store inventories were not previously available on the web.

It is another object of the present invention to provide an enhanced local shopping system that allows shoppers to use one web interface to find an available product or service near them from businesses without a web presence and from businesses with a web presence with multiple store locations by searching the stores' inventories with their locations in a database.

It is yet another object of the present invention to provide an enhanced local shopping system that stores retail business inventory data by geographic location so it can be matched with a location specified by a shopper.

It is a further object of the present invention to provide an enhanced local shopping system directory interface for a select group of businesses so shoppers can find their shopping options in a specific local area, such as a physical shopping mall.

It is an additional object of the present invention to provide an enhanced local shopping system that can receive an automated inventory update delivered across the Internet from the accounting system of a business without a web presence and make those inventory items searchable for shoppers based on location so that shoppers can verify whether a specific product or service is available within their local area.

It is still another object of the present invention to provide an enhanced local shopping system that extracts inventory information from many service appointment systems and stores that appointment inventory, along with location data, enabling shoppers to find available open appointments in their local area and book appointments.

It is one more object of the present invention to provide an enhanced local shopping system that uses criteria supplied by a shopper to search for a service across many service businesses in their local area to find which local businesses have an available opening to perform the desired service at the desired time so the shopper is presented with a list of local service offerings that meet their needs.

It is another object of the present invention to provide an enhanced local shopping system that presents available local inventories from individual small businesses without an Internet presence alongside large web stores or chain stores with a web presence so that shoppers get more complete local shopping options from one web site.

It is another object of the present invention to provide an enhanced local shopping system that uses a web data call to verify with businesses that have multiple store locations to get the most current inventory and determine the preferred selling location based on the proximity of the shopper for the business with available inventory.

It is yet another object of the present invention to provide an enhanced local shopping system that allows web shoppers to purchase products electronically by handling the e-commerce transactions for these businesses with physical stores that do not have a web presence for their product or service inventories.

It is yet another object of the present invention to provide an enhanced local shopping system that offers member stores and manufacturers the ability, though a web interface to the shopper, to present location-triggered coupons on specific products based on the location of a shopper to motivate the shopper to purchase a product or service that is available in inventory at a member store location that is local to the shopper, as well as present action-oriented coupons to shoppers within a specific area who match a specific set of criteria determined by the store to attract shoppers to purchase a specific item from a member store.

It is an additional object of the present invention to provide an enhanced local shopping system that allows member stores to create a specific shopper profile and a specific shopping area by which a special promotion from a member store is presented to shoppers who meet that profile and are in the specific area.

It is a further object of the present invention to provide an enhanced local shopping system that, along with the identity of a physical store where desired goods or services are available, provides a map and instructions how to get to the store.

It is an other object of the present invention to provide an enhanced local shopping system that enables manufacturers to upload images and descriptions of products based on product codes or part numbers or name of a product so they can be displayed to a shopper when a member store (reseller) that may not have a web presence is found to have the product or service in inventory.

It is an object of the present invention to provide an enhanced local shopping system that offers order-to-go transactions for stores without any previous web presence so shoppers can find products for sale locally, purchase the product through the system's e-commerce function and then have the product held for pickup at the store location or delivered.

It is yet another object of the present invention to provide an enhanced local shopping system that offers shoppers the ability to use the Internet to find stores in their area that have the desired product and also the desired transaction options and/or desired store open operation hours. (For example, a shopper might want to search for a local store that has the desired product or service that will be open at 8 p.m. and accepts checks).

It is one more object of the present invention to provide an enhanced local shopping system that allows shoppers to search for multiple products at the same time so they can see if there is a store that carries both products, or, if there is not a single store that carries both products, then the customer will be given the option of getting the list of stores in the same area that are physically close to each other and cover the product needs.

DETAILED DESCRIPTION OF THE PREFERRED EMBODIMENTS

Figure 1:
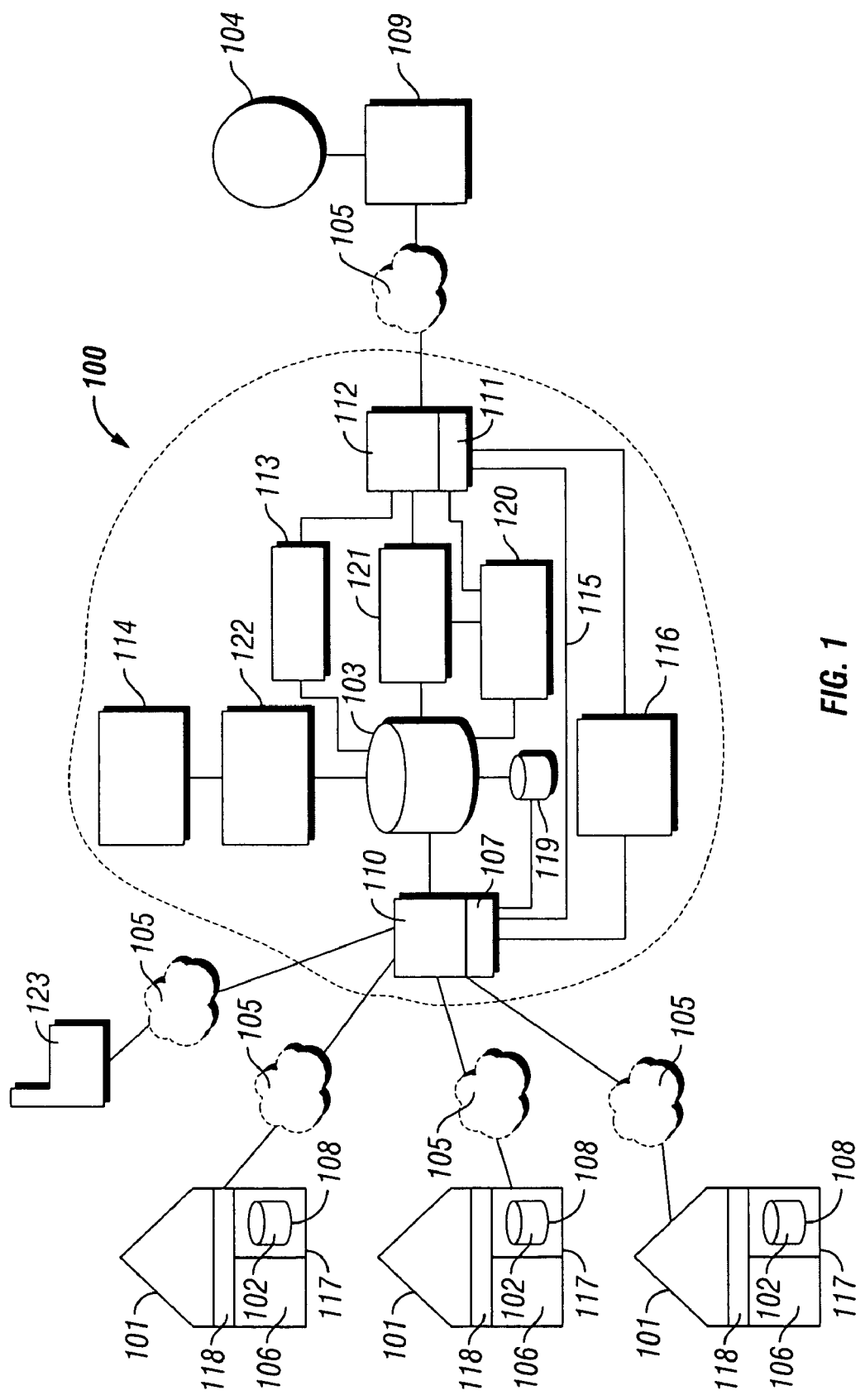
FIG. 1 is a functional block diagram illustrating the flow and processing of information and data in and out of the Internet enhanced local shopping system of the invention.

FIG. 1 is a block diagram that illustrates the system for Internet enhanced local shopping according to various embodiments of the present invention as described herein.

As used herein, "shopper" refers to a person seeking information preparatory to purchasing a product or service. While the invention will be described with reference to a shopper being a person (human being), it is within the scope of the invention for the shopper to also include a computer-driven search engine. Non-exhaustive examples of information sought include: product or service descriptions, price and comparisons, physical locations (stores) where the product or service is available and can be acquired, distance of store from shopper's location, hours of business, payment options, return policies and directions to the store.

As used herein, "member stores" refers to stores having physical locations where products and/or services are available and can be acquired, and which have contracted to make their store inventories and business information (e.g., hours, location, payment options, return policy, etc.) available for searching by a shopper. In addition, member stores are stores utilizing computer systems running business application software (e.g., Intuit's QuickBooks) that includes a computerized accounting/inventory control system that maintains the store's inventories in a store inventory database.

Referring to FIG. 1, according to one embodiment of the invention, a system 100 provides for a plurality of member stores 101 to connect via the Internet 105 (Internet link) and a member store interface 110 with a searchable database (search engine) 103 which can be accessed via the Internet 105 (Internet link) by a shopper 104 using a computer 109. The term "computer," as used in connection with a device 109 for connecting to the Internet and browsing the web, includes any of the several known web browser devices (including mobile phones and GPS devices in cars). Each store 101 has its current inventory of products and/or services 102 (inventory data 102) in a member store inventory database 108 which is part of the member store's computerized accounting/inventory control system 110. In addition to the inventory data 102, each member store 101 also has business data 106, such as store location, hours of business, payment options, return policies, gift wrap availability and the like. The inventory data 102 in member store inventory database 108 is made available to the searchable database 103 via the Internet 105 (Internet link) and member store interface 110. Typically, the interface 110 will be a web-based application, including a web page 107 which is accessed by a member store 101 via the Internet 105 in the usual manner. The member store business data 106 is entered into the searchable database 103 (through the interface 110) where it can be associated with inventory data 102.

Thus, a search for a product or service in database 103 by shopper 104 will return not only product or service information, but also the identification of a member store 101 where the product or service is available and all or some of the business data 106 of that member store 101.

A shopper 104 looking for a product or service that he or she can obtain locally, using a computer 109, connects via the Internet 105 to the searchable database 103 via a local shopper interface 112 and a local shopping link 113. The interface 112 is a web-based application including a web page 111 which is accessed by a shopper 104 via the Internet 105 in the usual manner. At the web page 111, shopper 104 is prompted to enter information necessary to carry out a search at search engine 103 for the product or service desired. If the product or service being sought by the shopper 104 is available at one or more member stores 101, and that information is in database 103, the search results will be displayed to shopper 104 at computer 109, including the identity of stores 101 having the service or product meeting the search criteria.

If, in addition to specifying a product or service, the shopper 104 also specifies business requirements (e.g., maximum distance to store, business hours include a particular timeframe, can pay by a particular credit card, store will deliver, store will gift wrap, etc.), then either only those member stores 101 will be reported that have both the product or service desired and the shopper's specified business requirements, or all member stores 101 having the product or service will be reported and sorted according to their business data 106 matching the specified business requirements.

Because the invention is designed to serve the needs of shoppers looking for a local physical store, such as a member store 101 where a product or service can be obtained, it is important to store geographic information (e.g., GIS location in the form of longitude and latitude) in database 103 about the member store 101 so it can be determined where the store is in relationship to the shopper 104 (or any other specified location). To provide distance and directions functions, the invention includes a location-matching module 122, and a mapping application module 114, such as MapQuest or the like, which is capable of providing the travel distance between any two specified addresses (or, in some cases, landmarks) and travel directions for getting from one place to another. The member store business data 106 includes the store's address which is stored in searchable database 103. The location of the shopper 104 is either entered into the database 103 through interface 112 as part of the shopper's manual log-in process, or entered automatically from a device 109 having a GPS chip. Regardless of how the shopper's location is entered into the database 103, it provides the information necessary for the location-matching module 122 to determine the distance from the shopper location to any of member stores 101 and for mapping application module 114 to supply driving or walking directions to a member store 101. The location-matching module 122 also comes into play when a search specifies a matching product or service in member stores 101 within a specified distance from the location of the shopper 104 or some other specified location. The stores 101 that meet the other search criteria (product or service, price, etc.) are further sorted by distance from the specified location and only those within the range specified are reported to the shopper 104.

In one embodiment, if no member store 101 meets all of the search criteria entered by shopper 104, some stores 101 that meet some of the criteria may be reported, but with a specific notice that one or more criteria are not met. For example, a shopper 104 may indicate that he or she only wants to purchase a specific product from a store that takes the American Express Card, that will be open until 10 p.m., and has a full refund return policy. The reported search results will include the member stores 101 that have the product in inventory, but make note of any business requirements that do not match the search criteria.

In addition to the searchable database 103, in one embodiment, the system 100 also includes a payment function module 116 that a member store 101 can contract to make available to a shopper 104. Secure systems 20 for making purchases over the Internet are well known and ubiquitous. In the same way that a physical store or restaurant makes arrangements with a credit card company to enable it to accept Visa™(Visa™ is a trademark of Visa International Service Association), Mastercard™(Mastercard™ is a trademark of Mastercard International Incorporated) or one of the other dozens of credit or debit cards popularly used as payment, a web store does the same. Because the present invention is directed, on the supply 25 side, primarily (but not exclusively) to physical stores 101 without a web presence, it follows that such member stores 101 have no way to transact business (receive payment) via the Internet. However, certain transactions involving stores 101 would be greatly facilitated if the stores were able to allow shoppers 104 to make payments via the Internet. Thus, the system 100 provides a web-based payment function module 116 that can be used by a shopper 104 to make payment to a member store 101, even if that member store 101 has no other presence on the Internet.

For example, if a shopper 104 wants to make a purchase from a member store 101 and wants to have the purchase delivered or shipped, the payment function module 116 is available to complete the payment part of the transaction. The payment function module 116 is presented to the shopper 104 at computer 109 in the same way as any other web-enabled payment system and its operation will be familiar to any shopper who has 5 made a web-based payment before. For some member stores 10 1, the financial arrangements with the underlying credit companies (Pay pal™ (PayPal™ is a registered trademark of PayPal, Inc.), Visa™ (Visa™ is a trademark of Visa International Service Association), Mastercard™ (Mastercard™ is a trademark of Mastercard International Incorporated, etc.) are part of system 100 which settles with the member stores 101 according to previously made arrangements. For member stores 101 that have their own arrangements with credit companies to handle their 10 web transactions, the use of the payment function module will directly involve the member store 10 1 and the credit companies. In either event, the details of any transaction using the payment function module 116 are reported to the supplying member store 101 via interface 110 and the Internet 105. For member stores 101 with established web sites that have a payment function, shoppers 104 can be directed to those web sites to conclude any financial transactions.

Even if the payment module 116 is not utilized by a shopper, the activity at shopper interface 112 may be of interest to a member store 101. Thus, a link 115 is provided between shopper interface 112 and member store interface 110. The interface 110 provides a secure channel for information flow between a shopper 104 and a particular member store 101 so that a communication intended to a particular member store 101 can be received only by that store. The link 115 allows, for example, a member store 101 to be informed that a shopper 104 has requested a specified product or service appointment be reserved and that the shopper 104 has fulfilled whatever requirements that particular member store has established for honoring such requests. Obviously, other transactional communications between the shopper 104 and a member store 101 can take place over link 115. In addition, a member store 101 can be advised of the number of times that its products or services have been reported in searches by shoppers 104. This frequency data can also form the basis for a payment by member stores 101 for having their inventory included in database 103.

The system 100 thus provides an easy and effective way for the small local retailer to gain business from web shoppers without having to establish a web presence and engage in advertising to drive customers to visit its web site. By plugging into the system 100, the small retailer without a web site or other presence on the web can have its inventory data 102 where it can be located by web shoppers 104 by accessing the database 103. Where the desired item is located and the store where it can be purchased and picked up identified, the shopper will either be driven to the store itself where the purchase transaction (payment) will proceed as with any walk-in customer, or where the shopper does not go to the store or needs to make an advance payment, the purchase transaction can be effected through the system's payment function module 116.

It will be understood by those skilled in the art that payment services providing the payment function described above are well known in the art and commercially available from several vendors. What is unique to the system 100 of the present invention is the availability of a payment function service to a retailer having no web presence in combination with the service of automatically offering the retailer's current inventory in a searchable database to which local shoppers are attracted.

Where shopper 104 is looking for a service, such as an appointment to get a hair cut, database 103 will locate all member stores 101 offering such services which meet the shopper's search criteria and present available appointment times (member store's inventory 102) which the shopper 104 can select. Where a deposit is required to secure the appointment, the payment function module 116 can be used.

Each member store 101 has a computerized inventory system 117 (typically, part of accounting/inventory management software application) which includes the inventory database 108. To become a member store 101, a retailer using a computerized inventory system and having a physical store where products can be purchased and taken away and/or where services are performed or arranged, logs onto the member store interface 110 web site 107. At the interface 110, a store is guided through a qualifying process which includes providing the store's business data 106 and a description of its computerized inventory system. The business data 106 includes various aspects of the store's business operations, such as its physical location, normal store hours, payment options, delivery availability, gift wrapping services, length of time it will hold an item, and any other limitations or special features of its business practices that the store wants potential customers to know about. Utilizing the functions available at interface 110, special features, such as discounts or sales, can be added to the business data 106 from time-to-time to appear whenever search results include that store.

To become a member store 101, a store logs onto the web site 107 and follows the prompts for qualifying and being accepted as a member store 101. Once a store wanting to have its inventory available to shoppers 104 who access the database 103 meets the qualifications for becoming a member store 101 and agrees to specified business terms, compatible client application software 118 is provided by downloading from the web site 107 to the store's computerized accounting/inventory control system which includes the computerized inventory system 117. Alternatively, a CD containing client application software 118 can be delivered to the store. Client software 118 sits on the store's computerized inventory system 117 and extracts the inventory data 102 from database 108 for delivery via the Internet 105 to the searchable database 103. The process for performing the function of software 118 of extracting inventory data 102 from database 108 and delivery of the data via the Internet 105 to searchable database 103 is either well known in the art or within the skill of programmers skilled in the art and thus need not be described herein.

In one embodiment of the invention, when a shopper submits a physical location, the location-matching module 122 establishes a GIS location in the form of latitude and longitude. When the shopper searches for a product or service, the system looks for matching products or services in the database 103. Products and services are stored in database 103 with the GIS locations (in the form of latitude and longitude) of the stores where they are available. The search results are arrived at by including only those products or services available at member stores 101 within the shopper's distance threshold by calculating to see if the store's GIS latitude and longitude coordinates are within a radius of x miles of the shopper's specified address (GIS latitude and longitude).

The following are five examples of processes for member store current inventory data 102 to be uploaded, maintained and updated in searchable database 103:

Process # 1 (for member stores with large inventories):
1. A store accesses the system 100 and registers all necessary business information at interface 110, including business name and physical location, so it can become a member store 101;
2. The store establishes a member store user name and password for future access to the system 100;
3. The store receives member store 101 client software 118;
4. Client software 118 automatically extracts the inventory data 102 out of the store's inventory database 108;
5. Client software 118 converts the inventory data 102 that is extracted from the store's inventory database 108 (part of a software application such as PeachTree or QuickBooks) into a format that can be used by the system 100 to merchandise the member store's products or services;
6. Client software 118 automatically sends the inventory data 102 to the database 103 of system 100;
7. The client software 118, at set times in the future or when inventory information changes in the member store's inventory database 108, automatically extracts the current inventory data 102 and uploads any modified data, additional product or service data or complete inventory data 102.

Process #2 (for member stores with only a few inventory items):
1. As part of the process of becoming a member store 101, a store accesses the system 100 and registers all necessary business information at interface 110, including business name and physical location.
2. The store establishes a member store 101 user name and password for future access to the system 100.
3. Member store 101 accesses web interface 107 to individually enter sale item information, product description and price information into the database 103 of system 100;
4. Member store 101 continues to enter sale item information, product description and price information, etc. into database 103 for any additional products/services that member store 101 plans to sell;
5. System 100 periodically sends e-mail reminders to member store 101 requesting updates on product inventory data 102.

Process #3 (for member stores with large inventories that have accounting/inventory management and other systems that can push inventory updates):
1. As part of the process of becoming a member store 101, a store accesses the system 100 and registers all necessary business information at interface 110, including business name and physical location.
2. The store establishes a member store 101 user name and password for future access to the system.
3. Member store accounting/inventory management system 117 is configured to push inventory data to the system 100 via the Internet 105.
4. Member store accounting/inventory management system 117 automatically sends the inventory data 102 over the Internet 105 to the database 103 of system 100 by electronic data transfer, such as XML or RSS.
5. The system 100 automatically receives the upload of the modified or additional product/service inventory data that is pushed from the member store accounting/inventory management system 117 and incorporates it in the system database 103 so that it can be matched to shoppers 104 looking for products/services locally.
6. The system 100, at set times, automatically contacts (via the Internet 105) the member store accounting/inventory management software application to have the accounting/inventory management application software upload any modified inventory data 102, additional product/service data or complete inventory data.

Process #4 (for member stores with many inventory items and multiple store locations):
1. The business with various store locations is registered with the system 100 so that it becomes a member store 101;
2. The member store with various locations establishes a member store 101 user name and password for future access to the system 100;
3. A software application 118 provided by system 100 is used to automatically extract the inventory data 102 out of the inventory database 108 of the member store 101 with various locations;
4. The client software 118 converts the member store inventory data 102 into a format that can be used by the system database 103 to merchandise the member store's products;
5. The client software 118 automatically submits inventory data 102 into the system database 103.
6. The client software 118, at set times or when inventory information changes in the member store's inventory database 108, automatically uploads the modified or additional product inventory data 102.

Additional actions for Process #4 could include:
7. When a shopper 104 uses the system 100 to look for a product/service that matches at least one inventory item in database 103 from a member store 101 with many inventory items and multiple store locations that has high product/service turnover in their various store locations, the system 100 sends a current inventory request over the Internet 105 to the member store system for store matches within a specific area.
8. The member store 101 replies back over the Internet identifying their stores in the desired area (plus additional merchandising information like quantities or special discounts) that have the product/service currently in stock).

Process # 5 for member stores with many inventory items and multiple store locations:
1. The store accesses the system 100 and registers all necessary business information, including business name and physical locations, so it can become a member store 101.
2. The store establishes a member store 101 user name and password for future access to the system.
3. Member store computerized inventory system 117 or another internal system is configured to push inventory data to the system 100 and database 103 via the Internet 105.
4. Member store computerized inventory system 117 automatically sends the inventory data 102 over the Internet 105 to the database 103 of system 100 by an electronic data transfer, such as XML or RSS (the inventory data 102 could also be pulled over the Internet 105 and imported in the database of 103 of system 100 by using an FTP server).
5. The system 100 automatically receives the upload of the modified or additional product/service inventory data that is pushed from the member store computerized inventory system 117 and incorporates it in the system database 103 so that it can easy be matched to shoppers 104 looking for products/services locally.
6. The system 100, at set times, automatically contacts (via the Internet 105) the member store computerized inventory system 117 to upload the current inventory data 102 (including product images and descriptions) and upload the modified, additional product/service or complete inventory data.

Additional steps for Process #5 could include:
7. When a shopper 104 uses the system 100 to look for a product/service that matches at least one inventory item in database 103 from a member store 101 with many inventory items and multiple store locations that has high product/service turnover in their various store locations, the system 100 sends a current inventory request over the Internet 105 to the member store system for store matches within a specific area.
8. The member store 101 replies back over the Internet 105 identifying its stores in the desired area (plus additional merchandising information like quantities or special discounts) that have the product/service currently in stock).

In order to encourage member stores 101 to maintain current inventories in database 103, the following procedures (by way of example) can be instituted: (1) if the system 100 does not receive an inventory update within a set period of time since the last update, the member store 101 will be put on pending status and all products/services for that member store will no longer be visible to any shoppers 104; (2) if a shopper complains that a member store 101 was out of stock of an item that system 100 was showing as in stock, then the system 100 will automatically trigger an inventory update from that member store 101.

Numerous other scenarios and process steps for keeping the inventories in system database 103 current are possible and will occur to those skilled in the art.

The member store interface 110 is web-based and is designed to be accessed from any type of web browser (desktop browser, handheld browser, auto navigation system browser, television browser, etc.). The member store interface 110 is, in essence, a control panel into the system 100. For example, some of the information or functionality that member stores 101 will be able to access from the member store interface 110 includes:

- Allow a member store 101 to initiate an inventory file upload from its PC;
- View a list of files that have recently been uploaded;
- Allow a member store to click on a processed file link to see what inventory was imported when it was processed;
- Allow a member store to view a transaction history of its web transactions;
- Allow the member store to fill in a form once it ships item(s) for a shopper (who purchased over the web) so the shopper can view the details and get their tracking numbers; and
- Allow a member store to view the shopping traffic to its products on system 100 and how many shoppers requested map directions to the member store location after looking at a product.

The client software 118 includes functionality by which the extraction of inventory from the inventory database 108 can be selective so as to include less than all of the inventory data 102 in inventory database 108. It can also be programmed to automatically deliver up-to-date inventory data to searchable database 103 on a periodic basis. In addition, the client software 118 receives notification of purchases out of the store's inventory and can adjust the inventory data 102 in database 108 accordingly. Further, the client software 118 permits the store 101 to create specials by discounting selected inventory items.

In one embodiment of the invention, system 100 includes a product description database module 119 which matches UPC, ISBN or any other codes that are used to identify the products in an inventory database 108 to product descriptions and/or images provided by manufacturers. While database 119 is shown as a separate element in the system, it will be understood by those skilled in the art that the database 119 could be included in database 103 or part of the client software 118 and provide the same functionality.

Many products today have codes that are printed on the product packaging (or sometimes the product itself) that identify the product. In many instances, the code is displayed in a machine-readable format (like a bar code). When a product arrives at a member store 101, for example, the product is typically scanned (e.g., bar code is scanned by an electronic reader), whereby its identifying code is entered into the inventory database 108. The product description database module 119 recognizes this code and is able to match the code to the product description (which can include an image or even a video) that is supplied by the manufacturer or distributor of that product. When a shopper 104 is searching for a product, the module 119 can, either automatically or on demand, supply a high-end description through shopper interface 112 to the shopper 104 of a specified product or service to better merchandise the product or service on behalf of the member store 101 and increase the correlation between a shopper's requested product or service and the matching products or services in the searchable database 103.

In addition to manufacturer's descriptions, which can be entered into database 119 by manufacturers 123 via the Internet 105 and interface 110, database 119 can include descriptions entered by member stores 101 via the Internet and interface 110 to enhance the marketing of their products or services. Thus, any product or service identification can be expanded into a commercial by providing a hyperlink to either the manufacturer's expanded descriptions or descriptions provided by a member store 101 and stored in database 119.

It is contemplated that product and service inventory data 102 will be input into database 103 from many member stores 101 using several different raw forms. Some of the inventory data 102 received may be from the client software application 118 that extracts inventory information from off-the-shelf accounting software, such as QuickBooks in QBXML form. Inventory data may be received from member stores 101 in other formats, such as XML, CSV or some other commonly used format. The present invention takes the data in any of these many different raw forms and converts it (at, for example, interface 110) so that it presents it to shoppers 104 in one simple form that best merchandises the products. The conversion can also be accomplished by the client software 118, or elsewhere. Software for performing this function of application 118 is either well known in the art or within the skill of programmers skilled in the art and thus need not be described herein.

The invention depends on current inventory data 102 to provide shoppers with reliable information of the current inventory of a member store 101 in the local area of the shopper 104. Some of the different processes that are used to extract inventory data 102 from a member store's inventory database 108 include (for example):

- A software client 118 (that the member store can download from the service provider) that extracts inventory data from the inventory database 102 of the member store 101.
- A FTP server (not shown) to get the latest inventory information from a member store 101.
- An uploaded inventory data file from the accounting/inventory management system 117 of a member store 101.
- A data call via the web to the member store 101 to get the latest inventory data.

A shopper 104 can access database 103 and other functions offered by system 100 using any one of a number of computer devices 109 currently available that connect to the Internet. Computer 109 can include computer desktop web browsers, handheld browsers, TV browsers, browsers for car navigation systems or even voice-activated virtual browsers. The invention is not limited by the choice of browser device 109, as the shopper interface 112 recognizes the browser 109 shopper 104 is using to access the system 100 so that all necessary content directed to the shopper 104 is presented in the correct and optimized format.

The content of the interface 112 via a web page 111 will guide a shopper and help focus the intent of his or her search so that the results will be limited and more exact. A shopper will be prompted to enter a "subject matter" and then the shopper may be prompted to answer a number of queries designed to determine his or her specific intent. The interface will easily guide a shopper 104 through queries regarding products and services to help him or her determine the exact item he or she is looking for. Where necessary, interface 112 requests additional data to be input by the shopper 104. For example, the interface 112 will request the shopper's location information and the maximum distance the shopper is willing to travel to help find the location of a member store offering a product based on current distance away.

Because shoppers often want to compare the terms of purchasing product locally from a member store 101 with purchasing terms from a web store (a store that may or may not have a physical location where products can be purchased and carried away, but offers on-line payment and shipping), one embodiment of system 100 of the present invention includes a web shopping module 120 which can be accessed through shopper interface 112. Web shopping module 120 provides the search and report capabilities of any one of several well known web shopping services, such as Shopping.com and Nextag, to name but two. Shopper 104 can specify at web site 111 that a web store only search is desired, in which case, only web module 120 will be accessed and all results will provide on-line payment and shipping services. As previously described, a shopper 104 can request a local search only, in which case, the searchable database 103 is accessed via local shopping link 113. If shopper 104 wants to have both a web search and a local search, both web shopping module 120 and searchable database 103 are accessed simultaneously via combined search module 121.

If shopper 104 decides to make a purchase from a web store that is not being hosted by the system 100 payment function module 116, the shopper 104 is prompted to the web store's web site where the purchase transaction is carried out using the web store's payment and shipping functions.

An example of the steps a shopper 104 would take in using the system 100 to find a product in a local member store 101 is:
1. Shopper 104, after logging onto the shopper interface web site search page 111, follows prompts to enter the product name or description;
2. Shopper 104 is prompted to reveal certain choices about the intent of the search;
3. If the shopper 104 reveals an intent is to find a product from a local member store 101, he or she is presented with an input screen asking for his or her location information (or the location from which he or she wants distance measured): for example:
   Street address or cross-streets
   Zip Code, city, state
   Distance the shopper is willing to travel (The location GIS information in the form of latitude and longitude might also be obtained by using the location services offered by the wireless carriers, if the customer is using a mobile device, or be obtained by the IP address location.);
4. The search is submitted to database 103 for matches and, since the products and services in the database 103 are stored with the GIS information of each member store 101 that offers them, that location information is used in step 5, below;
5. The location-matching module 122 determines which member stores 101 having products that meet the specified criteria are within the desired travel distance from the shopper based on the GIS location of the member store 101 and the GIS location of the shopper 104;
6. A list of member stores 101 that have the product that matches what the user is looking for is presented to the user at computer 109, along with any other specified criteria;
7. The shopper 104 is then able to sort the matching product results by criteria such as by: distance away; price; description details (like size or color); payment options; hours that the store is open;
8. Shopper 104 chooses a store that has the product that meets the shopping needs and, upon request, is provided walking/driving directions from the map function module 114 (i.e., MapQuest™ (MapOuest™ is a registered trademark of Geosystems Global Corporation)).

Another example of how system 100 allows a shopper to find a product in a local member store 101 is:
1. As before, the shopper's intent is determined to be to buy a particular product from a physical store;
2. The shopper 104 provides location information and the distance that the shopper 104 is willing to travel;
3. System 100 matches the product information to products in member store 101 inventories in searchable database 103;
4. The location of shopper 104 is submitted to location-matching module 122, along with the distance that the shopper is willing to travel;
5. The location-matching module 122 uses the map module 114 to determine which zip codes are less than the stated distance away that the shopper is willing to travel by submitting the zip code of the shopper 104 to the map function module 114 and the maximum distance shopper 104 has specified;
6. Database 103 selects the member stores 101 that have the specified product and are in the zip codes that map module 114 presented to location-matching module 122;
7. A list of member stores 101 that have the product and are within the user's desired travel distance are identified to shopper 104 at computer 109;
8. Shopper 104 selects a store from the list;
9. The location information of the user and the location of the selected store is presented to map module 114;
10. Map module 44 responds back with directions to the chosen store which are presented to the shopper 104.

Of course, various changes, modifications and alterations in the teachings of the present invention may be contemplated by those skilled in the art without departing from the intended spirit and scope thereof. As such, it is intended that the present invention only be limited by the terms of the appended claims.

What is claimed is:

1. A method for online shopping, comprising:
   extracting a first plurality of inventory items from an accounting system of a first retailer using a processor, wherein the accounting system of the first retailer comprises an inventory database storing the first plurality of inventory items;
   updating the inventory database using a point of sale terminal of the accounting system before extracting the first plurality of inventory items;
   transmitting the first plurality of inventory items to an online shopping system comprising a searchable database and a website, wherein the searchable database is updated to include the first plurality of inventory items;
   receiving, at the web site, a search request comprising a product, a location of a shopper, and a maximum traveling distance as search criteria after updating the searchable database;
   retrieving a first inventory item comprising the product from the searchable database, wherein the first plurality of inventory items comprises the first inventory item, and wherein a location of the first retailer is within the maximum traveling distance from the location of the shopper; and
   sending the location of the first retailer and a portion of the first inventory item in response to the search request.

2. The method of claim 1, further comprising:
   extracting a second plurality of inventory items from an accounting system of a second retailer;
   transmitting the second plurality of inventory items to the on-line shopping system, wherein the searchable database is updated to include the second plurality of items;

retrieving a second inventory item comprising the product from the searchable database, wherein the second plurality of inventory items comprises the second inventory item, and wherein a location of the second retailer is within the maximum traveling distance from the location of the shopper; and sending the location of the second retailer and a portion of the second inventory item in response to the search request.

3. The method of claim 1, further comprising: receiving a trigger to start extracting the first plurality of inventory items.

4. The method of claim 3, wherein the trigger is issued periodically.

5. The method of claim 1, further comprising:
converting the first plurality of inventory items to XML before updating the searchable database.

6. The method of claim 1, wherein the first inventory item further comprises a price of the product at the first retailer.

7. The method of claim 6, wherein the portion of the first inventory item comprises the price of the product at the first retailer.

8. The method of claim 1, wherein the first inventory item further comprises a manufacturer of the product.

9. The method of claim 8, further comprising:
sending a link to a website of the manufacturer in response to the search request.

10. The method of claim 1, further comprising:
obtaining a code for the product from the first inventory item after transmitting the first plurality of inventory items;
retrieving a product description of the product from a product description database module of the online shopping system based on the code; and
sending the product description in response to the search query.

11. The method of claim 10, wherein the product description comprises an image of the product.

12. The method of claim 10, wherein the product description comprises a video of the product.

13. The method of claim 1, further comprising:
charging the first retailer a fee for sending the location of the first retailer in response to the search request.

14. The method of claim 1, further comprising:
obtaining a payment for the product in a first format after sending the portion of the first inventory item; and
sending the payment in a second format to the first retailer.

15. The method of claim 14, wherein the first format is a credit card.

16. The method of claim 1, further comprising:
sending a client software module to the first retailer for extracting the first plurality of inventory items.

17. The method of claim 1, further comprising:
obtaining business data from the first retailer.

18. The method of claim 17, wherein the business data comprises hours of operation of the first retailer.

19. The method of claim 17, wherein the business data comprises a form of payment accepted by the first retailer.

20. The method of claim 19, wherein the search request specifies the form of payment.

21. A system for online shopping, comprising:
a first processor executing a client software module configured to extract a plurality of inventory items from an accounting system of the retailer, wherein the accounting system comprises an inventory database storing the plurality of inventory items, and wherein the first processor is configured to update the inventory database using a point of sale terminal of the accounting system before extracting the first plurality of inventory items;
a searchable database operatively connected to the client software module through a network and configured to obtain the plurality of inventory items from the client software module;
a website operatively connected to the searchable database and configured to obtain a search request comprising a product, a location of a shopper, and a maximum traveling distance as search criteria; and
a second processor executing a search module configured to retrieve an inventory item from the searchable database, and send a portion of the inventory item and a location of the retailer in response to the search request,
wherein the plurality of inventory items comprises the inventory item, and wherein the location of the retailer is within the maximum traveling distance from the location of the shopper.

22. The system of claim 21, further comprising:
a location matching module operatively connected to the website and configured to calculate a distance between the location of the shopper and the location of the retailer.

23. The system of claim 21, further comprising:
a payment function module operatively connected to the website and configured to obtain a payment for the product in a first format and send the payment to the retailer in a second format.

24. The system of claim 23, wherein the first format is a credit card.

25. The system of claim 21, further comprising:
a product description database module operatively connected to the website and configured to retrieve a description of the product based on a code in the inventory item, wherein the description is sent in response to the search request.

26. The system of claim 25, wherein the description of the product comprises a video of the product.

27. The system of claim 25, wherein the description comprises an image of the product.

28. The system of claim 21, wherein the inventory item comprises a price of the product at the retailer.

29. The system of claim 28, wherein the portion of the inventory item comprises the price of the product.

30. The system of claim 21, wherein the inventory item comprises a manufacturer of the product.

31. The system of claim 21, wherein the client software module is further configured to convert the plurality of inventory items to XML.

32. The system of claim 21, wherein the searchable database stores business data of the retailer.

33. The system of claim 32, wherein the business data comprises hours of operation of the retailer.

34. The system of claim 32, wherein the business data comprises a form of payment accepted by the retailer.

* * * * *